(12) United States Patent
Maegawa

(10) Patent No.: US 7,426,173 B2
(45) Date of Patent: Sep. 16, 2008

(54) METHOD AND APPARATUS FOR DEFINITION OF SIGNAL FOR RECORD MEDIUM

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 320 days.

(21) Appl. No.: 11/223,006

(22) Filed: Sep. 12, 2005

(65) Prior Publication Data

US 2006/0044994 A1   Mar. 2, 2006

Related U.S. Application Data

(63) Continuation of application No. PCT/JP2004/010830, filed on Jul. 29, 2004.

(30) Foreign Application Priority Data

Aug. 22, 2003   (JP)   ............... 2003-298630
May 27, 2004   (JP)   ............... 2004-157352

(51) Int. Cl.
*G11B 7/24*   (2006.01)
(52) U.S. Cl. ............... 369/275.1; 369/30.11
(58) Field of Classification Search ............... 369/275.1, 369/94

See application file for complete search history.

(56) References Cited

U.S. PATENT DOCUMENTS

| | | | | | |
|---|---|---|---|---|---|
| 5,640,382 | A | * | 6/1997 | Florczak et al. | 369/275.1 |
| 5,689,497 | A | * | 11/1997 | Wilting et al. | 369/275.1 |
| 5,726,969 | A | * | 3/1998 | Moriya et al. | 369/275.1 |
| 6,160,787 | A | * | 12/2000 | Marquardt et al. | 369/275.1 |
| 6,324,148 | B1 | * | 11/2001 | Kaneko et al. | 369/94 |
| 6,343,060 | B1 | * | 1/2002 | Ko | 369/275.1 |
| 6,667,947 | B2 | * | 12/2003 | Maeda et al. | 369/275.1 |
| 6,728,174 | B1 | * | 4/2004 | Sako et al. | 369/94 |
| 6,731,578 | B1 | * | 5/2004 | Sako et al. | 369/94 |
| 6,795,389 | B1 | * | 9/2004 | Nishiuchi et al. | 369/275.3 |
| 6,894,962 | B1 | * | 5/2005 | Nishiuchi et al. | 369/275.3 |
| 6,954,412 | B1 | * | 10/2005 | Sako | 369/94 |
| 6,999,396 | B2 | * | 2/2006 | Kurokawa et al. | 369/275.2 |
| 7,203,155 | B2 | * | 4/2007 | Nakamura et al. | 369/94 |

FOREIGN PATENT DOCUMENTS

| | | |
|---|---|---|
| JP | 2000-235733 | 8/2000 |
| JP | 2001-52342 | 2/2001 |
| JP | 2003-91874 | 3/2003 |
| WO | WO 00/23990 | 4/2000 |
| WO | WO 00/79525 | 12/2000 |
| WO | WO 02/056307 | 7/2002 |

* cited by examiner

*Primary Examiner*—Tan X Dinh
(74) *Attorney, Agent, or Firm*—Dickstein Shapiro LLP

(57) ABSTRACT

In an optical information record medium including a plurality of record layers that are recordable, various signal characteristics with respect to an area X in a record layer A (second layer) among the plurality of record layers are defined under a condition that an area Y in a record layer B (first layer) adjacent to the record layer A (second layer) on an incident side thereof along an optical axis of a light beam shone on the area X is a prerecorded area. This suppresses variation and errors in the measurement of characteristics of various signals caused by the interfering light coming from an adjacent record layer, thereby making it possible to manage and define media parameters with characteristic values having high reliability, compatibility, and reproducibility.

7 Claims, 8 Drawing Sheets

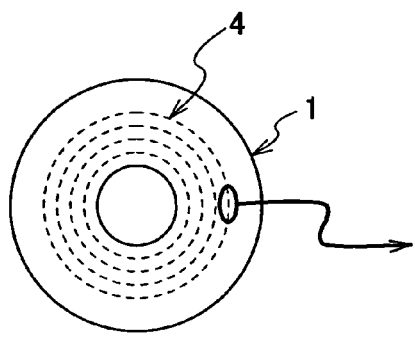
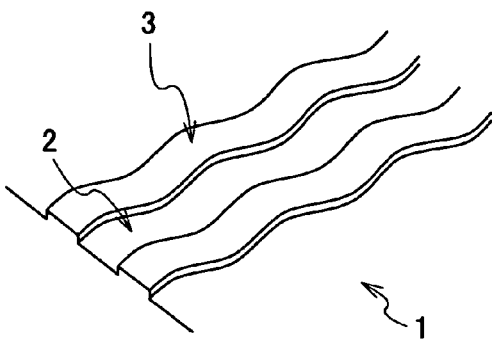
FIG.1A  FIG.1B
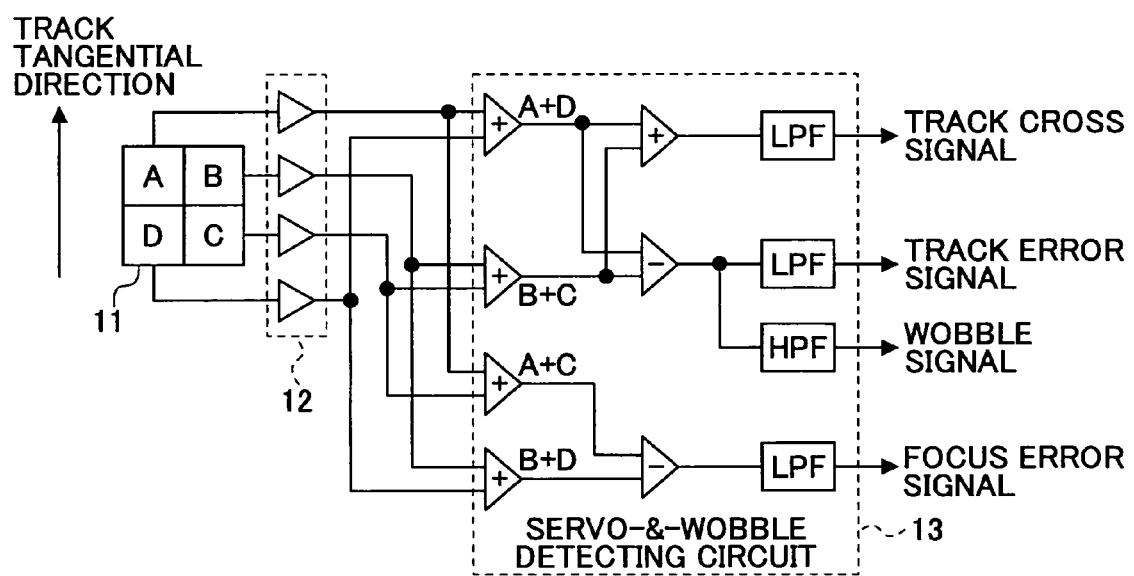
FIG.2

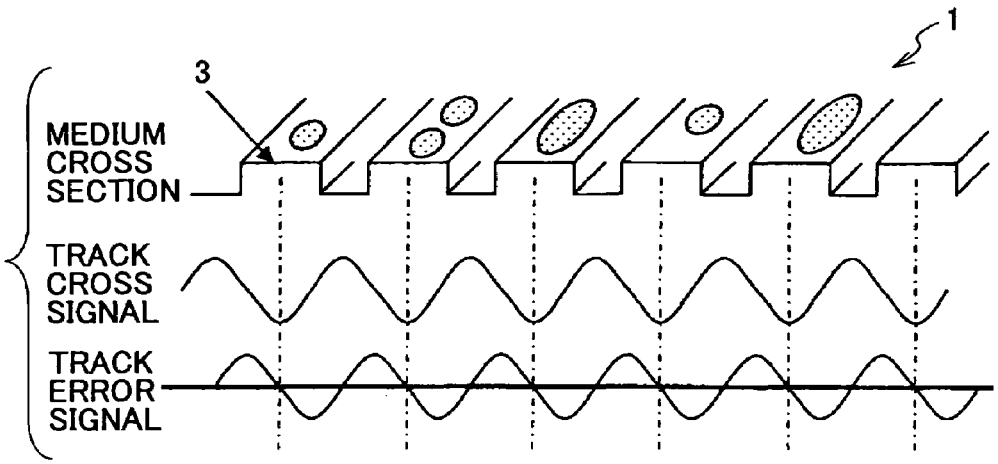
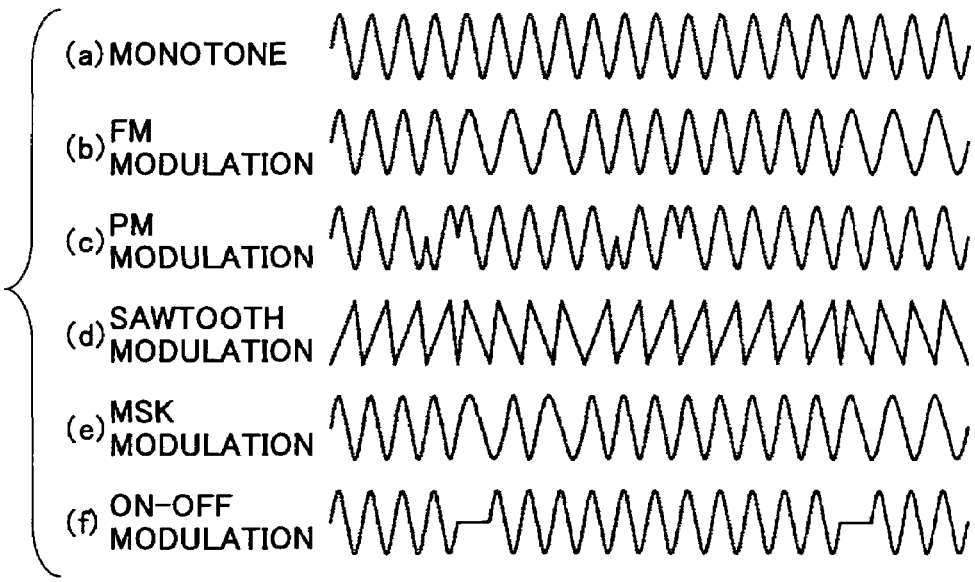

METHOD AND APPARATUS FOR DEFINITION OF SIGNAL FOR RECORD MEDIUM

CROSS-REFERENCE TO RELATED APPLICATION

This is a continuation of International Application No. PCT/JP2004/010830, filed on Jul. 29, 2004, the entire contents of which are hereby incorporated by reference.

BACKGROUND OF THE INVENTION

1. Field of the Invention

The present invention relates to an optical information record medium that is recordable and has a multi-layered structure having two or more layers such as a two-layered version of CD-R/RW, a two-layered version of DVD±R/RW, or a future multi-layered record medium, and also relates to a method of defining the characteristics of such medium, a method of examining the characteristics of the medium, a method of detecting a signal, a circuit for detecting a signal, and an optical information recording/reproducing apparatus.

2. Description of the Related Art

It can be said that in recent years, CD-R/RW and DVD±R/RW have been established as an external storage device for PCs. These CD-R/RW and DVD±R/R are expected to provide further increased capacity, and study has been made with respect to the two-layered structure and also a structure for future with further increased numbers of layers.

In such multi-layered media, the distance between layers is set such that light reflected by a record layer different from the record layer being accessed does not interfere with the light reflected from the record layer being accessed. At a point far away from the focus point, light reflected from the medium disperses without being condensed by a lens, resulting in a level that is ignorable as signal magnitude. Optical limitations are imposed, however, such that all the multi-layers need to be disposed within a focus tolerable range (focus depth) that allows various satisfactory characteristics to be obtained. Because of this, the inter-layer distance cannot be widened as much as desired. As a result, interference with the light reflected from other layers occurs to no small extent.

An example of a multi-layered structure that has been put to practical use includes a two-layered version of DVD-ROM. This structure has two layers stamped at the factory and designed for Read-Only, so that a large margin is provided against various fluctuation. For the tracking purpose, the DPD (differential phase detection) method that uses a phase difference derived from the edges of a reproduced signal is employed, which provides a strong tolerance against changes in the light intensity (signal magnitude) caused by the interference with light reflected from other layers. Because of the Read-Only configuration, there is no need to detect a track and/or a wobble resulting from the wobbling of the track (groove). Trouble due to the interference with light reflected from other layers is thus rare.

A medium having a plurality of recordable layers is disclosed in Patent Document 1, 2, and so on, for example. These inventions improve the feasibility of multi-layered recording by specifying the record film characteristics such as record film thickness and record film material of the media designed for multi-layered recording. Further, Patent Document 3 discloses providing a wobble on each layer of a multi-layered record medium and inserting address information into the wobble.

As the feasibility of multi-layered recording increases based on basic research, essential technologies have been identified and invented. Needless to say, various types of servo signals and wobble signals are inevitably necessary in multi-layered media. It is important to manage the characteristics of these signals or define such characteristics as standards in order to improve compatibility and maintain stable quality.

[Patent Document 1] Japanese Patent Application Publication No. 2000-235733

[Patent Document 2] Japanese Patent Application Publication No. 2003-091874

[Patent Document 3] Japanese Patent Application Publication No. 2001-052342

In the case of multi-layered record media, the interference with light reflected from other layers becomes a major problem. If an adjacent record layer is unrecorded, for example, it has a high reflectivity, thereby generating intense reflective light. Since the focus of this reflective light is deviated, the light does not converge on the light receiving element. Nonetheless, this light interferes with the intended light reflected from the record layer being accessed, so that the reflected light does not produce an accurate reading. If the adjacent record layer is prerecorded, on the other hand, its reflectance is low, so that the amount of the interference is small. In the case of a multi-layered structure, while interference occurs with any layers of the multi-layered structure, the interface with the adjacent record layer has the largest detrimental effect.

Various signal characteristics of a record medium can be tuned by use of a large number of parameters such as record film composition, record film thickness, groove depth, and groove width. As shown in Patent Documents 1 and 2, the record characteristics may be mainly tuned by selecting a record film material. Patent Document 1 and 2, however, do not teach the specifications of various signals. The term "various signals" used in the present specification and claims include servo signals such as a tracking error signal and a track cross signal obtained when a light beam crosses the tracks formed as grooves in the medium, a wobble signal that includes information about address and medium rotation speed as formed through the wobbling of a track, etc. In addition to these, of course, the amplitude of a reproduced (RF) signal is included as well. The characteristics of these signals are basically defined in terms of the amplitude thereof, and are normalized by use of a sum signal for the purpose of absorbing differences in the measurement conditions such as the intensity of the light beam, the amplification factor of the circuit, and the like. If light reflected from an adjacent record layer interferes to create an error in the sum signal, however, a failure may occur in that accuracy is lost with respect to the error.

The interference with light reflected from an adjacent record layer significantly varies depending on the optical system. This results in the lack of reliability and reduced compatibility.

When an adjacent record layer is a prerecorded area, its reflectivity is low, and the reflected light is weak. In this case, a failure caused by interference with the record layer being accessed may be small.

If the adjacent record layer is a prerecorded area, the recorded data component of the reflective light, despite its weak intensity, interferes with the light reflected from the record layer being accessed. Since the servo signals have different signal bands, the interference may not cause a problem. Since the wobble signal is close to the recorded data band, however, there is a need to pay a close attention. In the definition of the quality of a wobble signal, it is desirable to define a C/N (carrier-to-noise) ratio in the case of an adjacent record layer being prerecorded.

In this manner, the specification of various signals differs depending on the record status (unrecorded or prerecorded) of the adjacent record layer. Because of this, the method of providing definitions that is designed for the record layer having a one-layer (single-layered) structure cannot achieve stable management of the characteristics, not it can determine standard values.

Accordingly, the object of the present invention is to suppress variation and errors in the measurement of characteristics of various signals caused by the interfering light coming from an adjacent record layer, thereby making it possible to manage, define, and examine media parameters with characteristic values having high reliability, compatibility, and reproducibility.

SUMMARY OF THE INVENTION

It is a general object of the present invention to provide an optical information record medium that substantially obviates one or more problems caused by the limitations and disadvantages of the related art.

In order to achieve the object, the present invention provides the optical information record medium as follows.

An optical information record medium includes a plurality of record layers that are recordable, wherein various signal characteristics with respect to an area X in a record layer A among the plurality of record layers are defined under a condition that an area Y in a record layer B adjacent to the record layer A on an incident side thereof along an optical axis of a light beam shone on the area X is a prerecorded area. According to at least one embodiment of the present invention, this suppresses variation and errors in the measurement of characteristics of various signals caused by the interfering light coming from an adjacent record layer, thereby making it possible to manage and define media parameters with characteristic values having high reliability, compatibility, and reproducibility.

Further, the values of the various signal characteristics may have target values that are equal between the plurality of record layers. According to at least one embodiment of the present invention, there is no need to change the characteristics of various detecting circuits on a layer-by-layer basis, and it becomes possible to cope with an inexpensive examining apparatus and recording/reproducing apparatus.

Further, the various signal characteristics may also be defined under a condition that the area Y is an unrecorded area, and may be different from the various signal characteristics with respect to the area X that are defined under the condition that the area Y is the prerecorded area. According to at least one embodiment of the present invention, there is no need to perform complex tuning with respect to various parameters in order to satisfy the signal characteristics under both the unrecorded condition and the prerecorded condition, which results in the shortening of a development time. Moreover, it is also possible to perform tuning by placing emphasis on the improvement of characteristics under the prerecorded condition that is unfavorable to recording/reproducing operations.

Further, one of the various signal characteristics may be an amplitude of a track cross signal that is obtained when a light beam crosses a track. According to at least one embodiment of the present invention, it is possible to achieve satisfactory signal quality with the track cross signal having little amplitude variation, thereby making it possible to provide a recording/reproducing apparatus having high access speed.

Further, one of the various signal characteristics may be an amplitude of a track error signal that is obtained when a light beam crosses a track. According to at least one embodiment of the present invention, it is possible to achieve satisfactory signal quality with the track error signal having little amplitude variation, thereby making it possible to provide a recording/reproducing apparatus having high access speed and stable tracking performance.

Further, one of the various signal characteristics may be an amplitude of a wobble signal that is a wobbling component of a track. According to at least one embodiment of the present invention, it is possible to achieve satisfactory signal quality with the wobble signal having little amplitude variation, thereby making it possible to provide a recording/reproducing apparatus having high access speed, stable media rotation, and stable address detecting performance.

Further, one of the various signal characteristics may be a signal-to-noise quality of a wobble signal that is a wobbling component of a track. According to at least one embodiment of the present invention, it is possible to achieve satisfactory wobble signal quality, thereby making it possible to provide a recording/reproducing apparatus having high access speed, stable media rotation, and stable address detecting performance.

Moreover, a method of defining medium characteristics as follows is provided.

A method of defining medium characteristics with respect to an optical information record medium having a plurality of record layers that are recordable includes defining various signal characteristics with respect to an area X in a record layer A among the plurality of record layers under a condition that an area Y in a record layer B adjacent to the record layer A on an incident side thereof along an optical axis of a light beam shone on the area X is a prerecorded area. According to at least one embodiment of the present invention, this suppresses variation and errors in the measurement of characteristics of various signals caused by the interfering light coming from an adjacent record layer, thereby making it possible to manage and define media parameters with characteristic values having high reliability, compatibility, and reproducibility.

Further, the values of the various signal characteristics have target values that are equal between the plurality of record layers. According to at least one embodiment of the present invention, there is no need to change the characteristics of various detecting circuits on a layer-by-layer basis, and it becomes possible to cope with an inexpensive examining apparatus and recording/reproducing apparatus.

Further, the various signal characteristics may also be defined under a condition that the area Y is an unrecorded area, and may be different from the various signal characteristics with respect to the area X that are defined under the condition that the area Y is the prerecorded area. According to at least one embodiment of the present invention, there is no need to perform complex tuning with respect to various parameters in order to satisfy the signal characteristics under both the unrecorded condition and the prerecorded condition, which results in the shortening of a development time. Moreover, it is also possible to perform tuning by placing emphasis on the improvement of characteristics under the prerecorded condition that is unfavorable to recording/reproducing operations.

Further, one of the various signal characteristics may be an amplitude of a track cross signal that is obtained when a light beam crosses a track. According to at least one embodiment of the present invention, it is possible to achieve satisfactory signal quality with the track cross signal having little amplitude variation, thereby making it possible to provide a recording/reproducing apparatus having high access speed.

Further, one of the various signal characteristics may be an amplitude of a track error signal that is obtained when a light beam crosses a track. According to at least one embodiment of the present invention, it is possible to achieve satisfactory signal quality with the track error signal having little amplitude variation, thereby making it possible to provide a recording/reproducing apparatus having high access speed and stable tracking performance.

Further, one of the various signal characteristics may be an amplitude of a wobble signal that is a wobbling component of a track. According to at least one embodiment of the present invention, it is possible to achieve satisfactory signal quality with the wobble signal having little amplitude variation, thereby making it possible to provide a recording/reproducing apparatus having high access speed, stable media rotation, and stable address detecting performance.

Further, one of the various signal characteristics may be a signal-to-noise quality of a wobble signal that is a wobbling component of a track. According to at least one embodiment of the present invention, it is possible to achieve satisfactory wobble signal quality, thereby making it possible to provide a recording/reproducing apparatus having high access speed, stable media rotation, and stable address detecting performance.

Moreover, a signal detecting method and signal detecting circuit as follows are also provided.

A method of detecting a signal with respect to an optical information record medium having a plurality of record layers that are recordable includes making a comparison between a reflective signal level of an area X in a record layer A among the plurality of record layers obtained under a condition that an area Y in a record layer B adjacent to the record layer A on an incident side thereof along an optical axis of a light beam shone on the area X is a unrecorded area, and a reflective signal level of the area X obtained under a condition that the area Y is a prerecorded area, and changing an amplification factor or offset of various signals with respect to the area X in response to a record status of the area Y based on a result of the comparison.

A signal detecting circuit includes a sample circuit to hold a reflective signal level of an area X in a record layer A among a plurality of record layers that are recordable and contained in an optical information record medium, a record status check circuit to determine whether an area Y in a record layer B adjacent to the record layer A on an incident side thereof along an optical axis of a light beam shone on the area X is a unrecorded area or a prerecorded area, a memory circuit to store a sample circuit output held by the sample circuit for each case in which the area Y is a unrecorded area and in which the area Y is a prerecorded area, a comparison circuit to obtain a difference in signals output from the memory circuit between the case of the area Y being an unrecorded area and the case of the area Y being a prerecorded area, a signal correction circuit to change an amplification factor or offset of various signals in response to control signals that are an output of the comparison circuit and the reflective signal level of the area X, and a selecting unit to determine whether or not to use the output of the comparison circuit as a control signal for the signal correction circuit in response to an output of the record status check circuit. According to at least one embodiment of the present invention, it is possible to detect various signals having satisfactory quality with little amplitude variation and offset variation regardless of the record status of the adjacent record layer.

Further, an optical information recording/reproducing apparatus as follows is also provided.

An optical information recording/reproducing apparatus for recording or reproducing information with respect to the optical information record medium as described above includes a rotation mechanism to drive and rotate the optical information record medium, and a pickup having a light source and an objective lens to shine a light beam on the optical information record medium and to receive light reflected from the optical information record medium. According to at least one embodiment of the present invention, which performs the recording/reproducing of information with respect to the optical information record medium described above, it is possible to provide an information recording/reproducing apparatus having stable, reliable servo performance and high-speed access performance regardless of the record status of the adjacent record layer.

Further, the optical information recording/reproducing apparatus described above may further include the signal detecting circuit previously described. According to at least one embodiment of the present invention, it is possible to provide an information recording/reproducing apparatus having stable, reliable servo performance and high-speed access performance regardless of the record status of the adjacent record layer.

Further, a method of examining medium characteristics as follows is provided.

A method of examining medium characteristics with respect to an optical information record medium having a plurality of record layers that are recordable includes examining various signal characteristics with respect to an area X in a record layer A among the plurality of record layers under a condition that an area Y in a record layer B adjacent to the record layer A on an incident side thereof along an optical axis of a light beam focused on the area X is a prerecorded area. According to at least one embodiment of the present invention, this suppresses variation and errors in the measurement of characteristics of various signals caused by the interfering light coming from an adjacent record layer, thereby making it possible to examine media parameters with characteristic values having high reliability, compatibility, and reproducibility.

Further, the values of the various signal characteristics may have target values that are equal between the plurality of record layers. According to at least one embodiment of the present invention, there is no need to change the characteristics of various detecting circuits on a layer-by-layer basis, and it becomes possible to cope with an inexpensive examining apparatus and recording/reproducing apparatus.

Further, the various signal characteristics may also be examined under a condition that the area Y is an unrecorded area, and may be different from the various signal characteristics with respect to the area X that are examined under the condition that the area Y is the prerecorded area. According to at least one embodiment of the present invention, there is no need to perform complex tuning with respect to various parameters in order to satisfy the signal characteristics under both the unrecorded condition and the prerecorded condition, which results in the shortening of a development time. Moreover, it is also possible to perform tuning by placing emphasis on the improvement of characteristics under the prerecorded condition that is unfavorable to recording/reproducing operations.

Further, one of the various signal characteristics is an amplitude of a track cross signal that is obtained when a light beam crosses a track. According to at least one embodiment of the present invention, it is possible to achieve satisfactory signal quality with the track cross signal having little amplitude variation, thereby making it possible to provide a recording/reproducing apparatus having high access speed.

Further, one of the various signal characteristics may be an amplitude of a track error signal that is obtained when a light beam crosses a track. According to at least one embodiment of the present invention, it is possible to achieve satisfactory signal quality with the track error signal having little amplitude variation, thereby making it possible to provide a recording/reproducing apparatus having high access speed and stable tracking performance.

Further, one of the various signal characteristics may be an amplitude of a wobble signal that is a wobbling component of a track. According to at least one embodiment of the present invention, it is possible to achieve satisfactory signal quality with the wobble signal having little amplitude variation, thereby making it possible to provide a recording/reproducing apparatus having high access speed, stable media rotation, and stable address detecting performance.

Further, one of the various signal characteristics may be a signal-to-noise quality of a wobble signal that is a wobbling component of a track. According to at least one embodiment of the present invention, it is possible to achieve satisfactory wobble signal quality, thereby making it possible to provide a recording/reproducing apparatus having high access speed, stable media rotation, and stable address detecting performance.

According to at least one embodiment of the present invention, it is possible to suppress variation and errors in the measurement of characteristics of various signals caused by the interfering light coming from an adjacent record layer, thereby making it possible to manage, define, and examine media parameters with characteristic values having high reliability, compatibility, and reproducibility.

BRIEF DESCRIPTION OF THE DRAWINGS

Other objects and further features of the present invention will be apparent from the following detailed description when read in conjunction with the accompanying drawings, in which;

FIGS. 1A and 1B are drawings showing an optical information record medium that is used in an embodiment of the present invention as well as for general purposes;

FIG. 2 is a block diagram showing an example of a basic configuration of a signal processing block that extracts various signals;

FIG. 7 is a drawing showing examples of the waveform of a track cross signal and track error signal;

FIG. 8 is a drawing showing an example of the waveform of a wobble signal;

DESCRIPTION OF THE PREFERRED EMBODIMENTS

Figure 3:
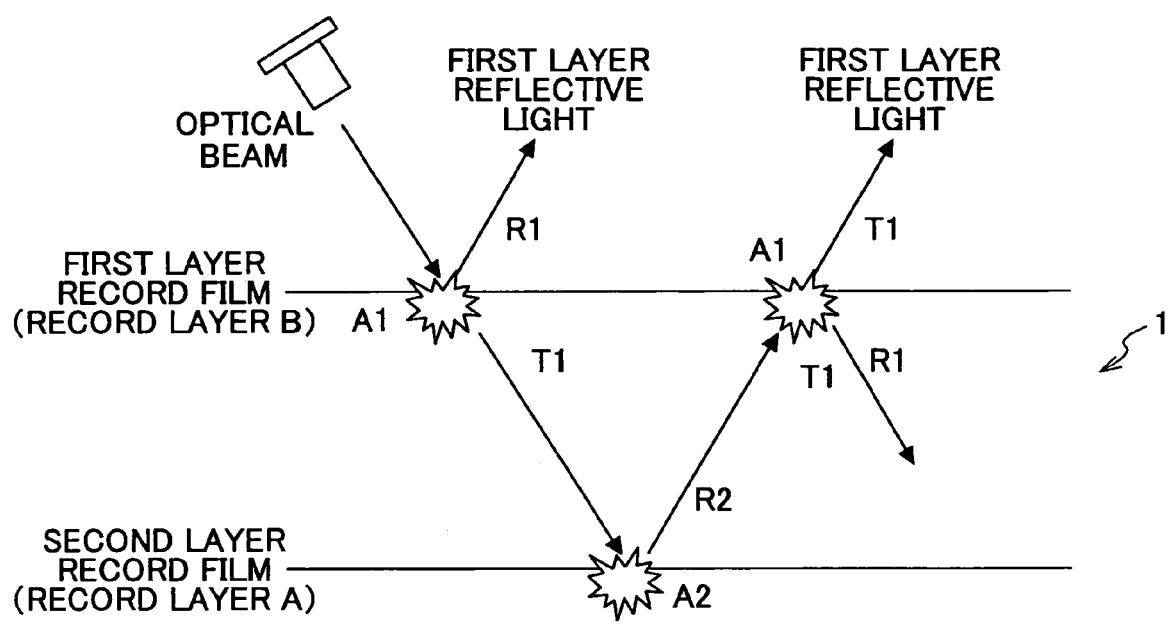
FIG. 3 is an illustrative drawing for explaining the principle of recording/reproducing with respect to a two-layered record medium.

In the following, the best mode for carrying out the invention will be described with reference to the accompanying drawings.

FIGS. 1A and 1B are drawings showing an example of the configuration of an optical information record medium 1 that is used in an embodiment of the present invention as well as for general purposes. FIG. 1A is a schematic plan view of the medium 1, and FIG. 1B is a schematic perspective view of a portion of the medium 1.

In the medium 1, a track 4 comprised of a groove 2 and land 3 is formed in concentric form or in spiral form. The track 4 is preformed by a media forming apparatus. An information recording/reproducing apparatus performs the recording/reproducing of information along the track 4. Further, the track 4 on the medium 1 wobbles (see FIG. 1B) such as to allow a signal having constant frequency (cycle) to be detected as rotation information when the medium 1 rotates at constant linear velocity or constant angular velocity. In the case of CD-RW or DVD+R/RW, the wobbling of the track 4 is set to a substantially constant frequency while the frequency and phase are slightly changed in some portions thereof for the purpose of recording address information. In other cases, only one side of the track may be configured to wobble, or the wobbling may break in an intermittent manner.

FIG. 2 is a drawing showing an example of a signal processing block that receives reflective light and extracts various signals as the light beam shone on the medium 1 is reflected. The light reflected from the medium 1 is received by a four-fold-division PD (photo detector) 11. The four-fold-division photo detector 11 is optically segmented into four light receiving areas by segmenting lines that run in the tangential direction and normal direction of the track on the medium surface. For the sake of convenience, the individual light receiving areas are denoted as A through D clockwise from the top left. An I/V circuit 12 converts the output of the photo detector, which is given as an electric current signal, into a voltage signal. Further, an add amplifier, subtract amplifier, LPF (low-pass filter), and HPF (high-pass filter) of a servo-&-wobble detecting circuit 13 extract various signals from the converted voltage signal. A track cross signal is a low-frequency signal obtained as a result of computation A+B+C+D. A track error signal is a low-frequency signal corresponding to (A+D)−(B+C). A wobble signal is obtained from the same computation as that of the track error signal, but is obtained as a high-frequency signal. A focus error signal is a low-frequency signal corresponding to (A+C)−(B+D). A reproduced (RF) signal is not illustrated here since the computation is preferably performed by use of a separate high-frequency-band circuit. Such computation is A+B+C+D.

What is illustrated here is the easiest way to compute the various signals. Needless to say, however, the division of the photo detector (PD) is not limited to what is illustrated, and finer segmentation may as well be used. Conversely, the number of divisions may be fewer such as in two-fold division or three-fold division. With such configuration, the computation of the signals may be optimized according to the employed form of light reception. Further, the track error signal may be obtained through the DPD (differential phase detection)

method. Moreover, provision may be made such that the various signals are detected from a plurality of light beams inclusive of a main beam and a sub beam. For example, this corresponds to a case in which the track error signal is computed based on three received light beams or computed according to the DPP (differential push pull) method. Further, the track cross signal may also be computed based on three beams. It should be noted that the focusing system may be configured to use a separate photo detector.

The wobble signal may be computed by use of a separate circuit from that of the track error signal, or various correction circuits may be inserted into a stage preceding the subtract amplifier.

Namely, it suffices if the computation methods are optimized according to the detection method. The method and means of extracting signals from the medium 1 are not a limiting factor.

FIG. 3 is an illustrative drawing showing the two-layered record medium 1 as an example of a multi-layered structure. There are two record layers, i.e., the first layer (corresponding to a record layer B) and the second layer (corresponding to a record layer A). The light beam enters the first layer first. The first layer absorbs the energy of the light beam with an absorption rate A1, thereby effecting recording. A reflectivity R1 differs between the mark (prerecorded area) and the space (unrecorded area), thereby allowing the recorded data to be read from the reflective light of the first layer. The light beam passing through the first layer record film with a light transmittance T1 reaches the second layer. In the second layer, recording is performed by the energy that is absorbed with an absorption rate A2. As in the first layer, a reflectivity R2 in the second layer differs between the mark and the space, thereby allowing the recorded data to be read from the reflective light of the second layer. To be exact, absorption and reflection occur when the reflective light from the second layer passes through the first layer again. Since the intensity of the light beam is sufficiently weakened at the time of the reflection on the second layer, no recording is performed when it reaches the first layer a second time. The same phenomenon may properly be considered to happen in the case of a multi-layered structure. Further, the same phenomenon may properly be considered to happen regardless of whether the type of the record film is Write-Once (R) or Rewritable (RW).

Figure 4:
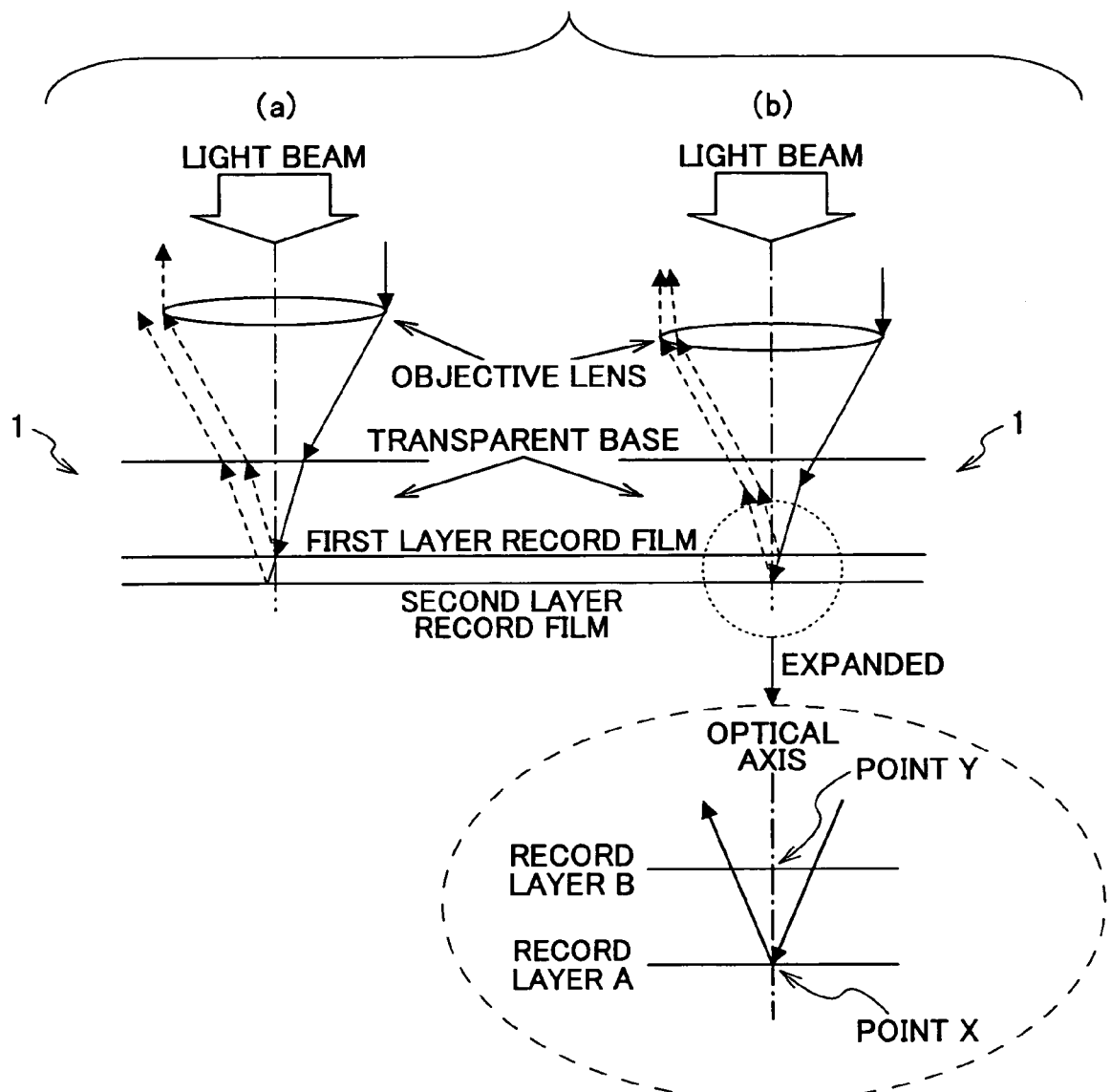
FIG. 4 is a drawing for explaining the effect of light reflected from each layer in the case of the two-layered record medium.

FIG. 4 is a drawing for explaining the traveling of a light beam by taking the two-layered record medium 1 as an example. FIG. 4-(a) illustrates a case in which the focus of the light beam is aligned with the first layer record film. Light (outward path) from the light source to the medium 1 is indicated by solid lines, and reflective light (homeward path) from the medium 1 is indicated by dotted lines. In FIG. 4, only the path indicative of the light incident into one edge of the objective lens is illustrated for the sake of simplification. The light beam is condensed on a media access point (focus point) by the objective lens. The optical axis of this light beam is illustrated by a chain line. Most of the light beam reflected by the first layer returns to the objective lens, and is condensed on the photo detector (Pb) (not shown) after traveling through the associated optical system. With respect to the light beam reflected by the second layer, light that has passed the center of the objective lens returns to the objective lens for condensation on the photo detector. Light that has passed an edge of the objective lens may return as reflective light and stray to outside the objective lens, or may return to the objective lens to end up dispersing before reaching the photo detector, with only a small possibility of actually reaching the photo detector. Namely, the light reflected from the second layer has a relatively small possibility of interfering with the light reflected from the first layer.

FIG. 4-(b) illustrates a case in which the focus is aligned with the second layer. As in the case of the first layer, light reflected from the second layer on which the focus is positioned returns to the objective lens for condensation on the photo detector. With respect to the light beam reflected from the first layer, light that corresponds to the center of the objective lens also returns to the objective lens, resulting in being condensed on the photo detector. However, light that has passed an edge of the objective lens, which did not return to the photo detector in the case of FIG. 4-(a), mostly returns to the objective lens. Despite the dispersion in the optical system before reaching the photo detector, therefore, light that actually reaches the photo detector is stronger than in the case of FIG. 4-(a). In the partially expanded view around the focal point, the first layer record film is shown as the record layer B, and the second layer record film is shown as the record layer A. Further, the points on the record layers A and B corresponding to the optical axis are denoted as an X point and Y point, respectively. The size of each point corresponds to an area (X area, Y area) relating to the diameter of the light beam on each layer.

In this manner, the way the interference with other layers occurs varies depending on whether the focus of the light beam is placed on the first layer or placed on the second layer. Specifically, an adverse effect is brought about more often than in other cases when the deeper layer (second layer) is accessed from the incident surface, with the reflective light from the near-surface layer (first layer) serving as a source of interference. When the near-surface layer is unrecorded so as to produce less reflective light, on the other hand, an adverse effect may be less pronounced.

Figure 5:
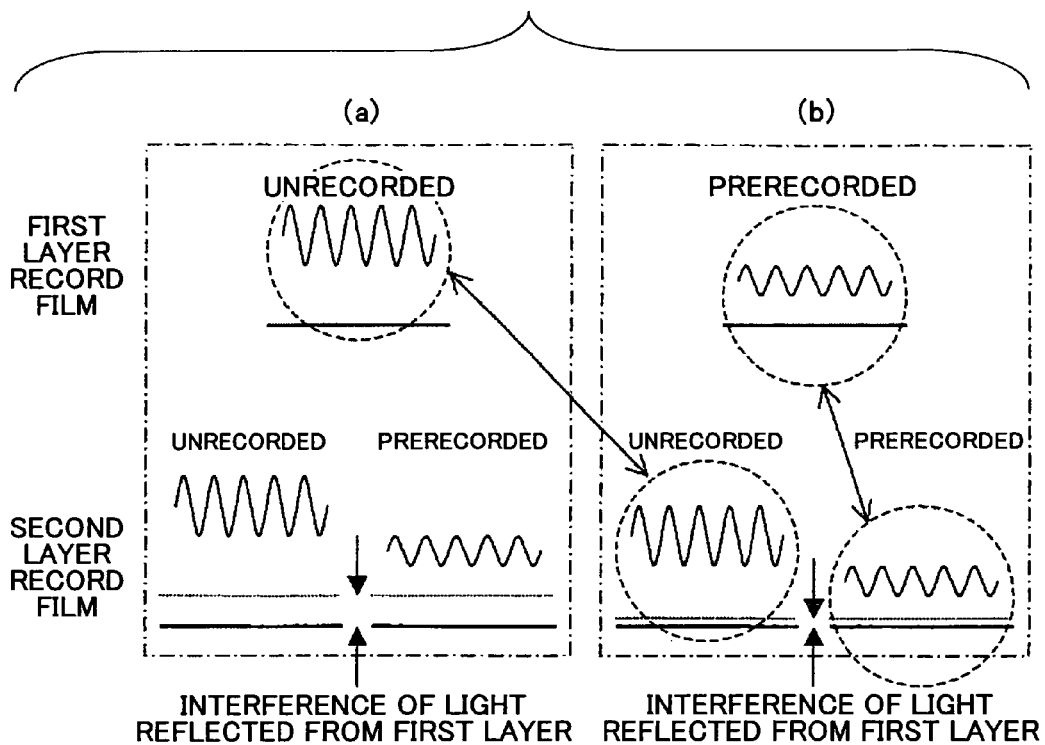
FIG. 5 is a drawing for explaining the effect of light reflected from each layer at the signal level in the case of the two-layered record medium.

FIG. 5 is a drawing for explaining the above by use of signal levels. The upper side and lower side illustrate signal levels derived from the light reflected by the record films of the first layer and second layer, respectively. FIG. 5-(a) illustrates a case in which the first layer (record layer B) is unrecorded, and FIG. 5-(b) illustrates signal levels in the case where the first layer (record layer B) is prerecorded. In FIG. 5, the thick lines indicate a reference (GND) level, and the sinusoidal waves indicate signal levels exemplifying a track cross signal. Further, the small-dotted lines in FIG. 5 indicate an offset of the signal levels caused by interference.

In the case where the first layer is unrecorded as shown in FIG. 5-(a), the reflective light is strong. When reflective light is detected by accessing the second layer, the reflective light from the first layer causes strong interference, thereby raising the signal level. In general, the interfering light falls on the entire surface of the photo detector, resulting in the sum of light being increased. Since the track cross signal is a sum signal, an increase in the signal level occurs.

In the case where the first layer is prerecorded as shown in FIG. 5-(b), on the other hand, the reflective light is weak. As a result, a strong interference does not occur, and its influence is small when detecting a signal from the second layer. As can be seen from this, the signal level from the second layer is strongly influenced by the record status (unrecorded or prerecorded) of the first layer. It should be noted that, as shown in FIG. 5, the signal level of the first layer is substantially the same as the signal level of the second layer under the condition that the first layer is unrecorded.

Figure 6:
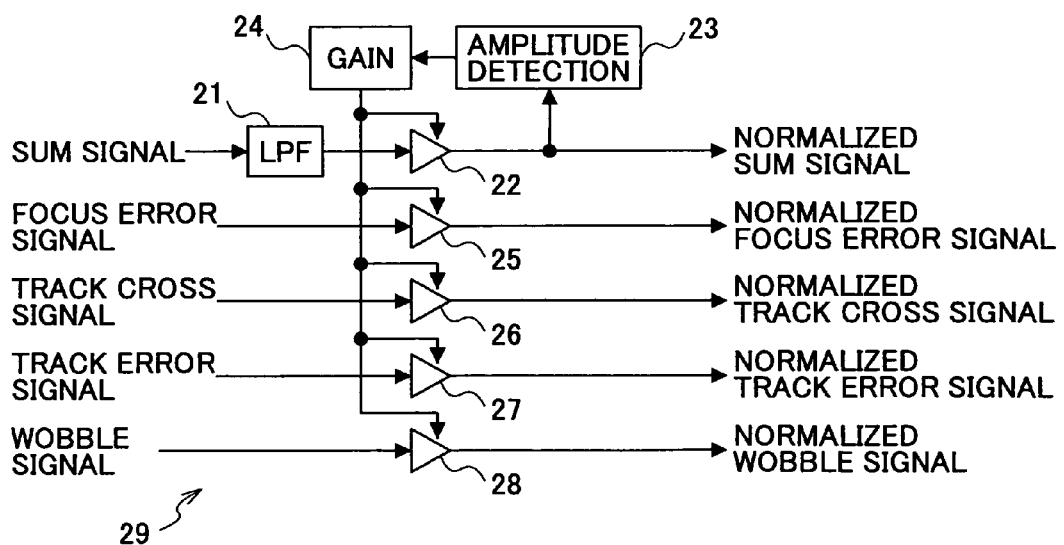
FIG. 6 is a block diagram showing an example of the configuration for the normalization of various signals.

The above description has been given simply by using a track cross signal as an example. In practice, however, a change in the light amount of the light beam, the gain (amplification factor) of the detection circuit, etc., vary depending on the measurement system, so that the normalization by a sum signal (a sum of four in the case of a four-fold-division photo detector) is typically employed in the definition of the various signals. FIG. 6 is a drawing showing an example of such a circuit block. A sum signal is averaged over by an LPF 21, and passes through an amplifier 22. The amplitude or signal level of the output is detected by an amplitude detecting circuit 23. A gain circuit 24 controls the amplification factor such as to produce a desired voltage (target value). The amplifier 22 amplifies the signal by this amplification factor. Through the series of operations as described, the normalized sum signal is maintained at the desired voltage level. The same amplification factor (which is the output of the gain circuit) is used by amplifiers 25 through 28 to amplify other signals (focus error signal, track cross signal, track error signal, wobble signal, etc.), thereby generating various normalized signals. Such circuit for amplitude adjustment is referred to as an AGC (auto-gain control) circuit (signal correction circuit) 29. Needless to say, the same effect as such processing can be obtained by performing data processing after digitalizing by use of an A/D converter.

The various signals normalized by the AGC circuit 29 may suffer errors in terms of their signal definitions when the interference with reflective light from other layers creates error in the sum signal to provide an incorrect amplification factor. Accordingly, it is desired to provide the definitions of signal characteristics under the condition of no interference with reflective light from other layers.

In consideration of this, the signal definition (such as amplitude) with respect to the second layer (record layer A) in this embodiment defines the specification of various signal characteristics under the condition that the first layer (record layer B) is prerecorded (more generally, under the condition that an adjacent layer is prerecorded). Further, the signal examination (such as amplitude) with respect to the second layer (record layer A) in this embodiment examines various signal characteristics under the condition that the first layer (record layer B) is prerecorded (more generally, under the condition that an adjacent layer is prerecorded). Here, the various signal characteristics may have target values that are equal among a plurality of record layers.

When an actual recording/reproducing operation is performed, the interference with reflective light from other layers poses an adverse effect. It is thus desirable to perform recording/reproducing under the condition that an adjacent layer is prerecorded. In the description provided above, it is desirable to record a medium in such a sequence of actions as to access the deeper layer under the condition that the near-surface layer is prerecorded.

FIG. 7 is a drawing showing the waveform of the track cross signal and track error signal in relation to the track 4 of the medium 1. The track cross signal assumes a waveform whose signal level drops at the center of the land 3 where information (comprised of marks and spaces) is recorded. The track error signal assumes a signal waveform that has zero-cross points at the center of grooves. Specific characteristics differ depending on the relation to recording density, and are difficult to be defined. Despite this, such conditions as "normalized track cross signal >0.1" and "0.22<normalized track error signal <0.8" may be preferable. In particular, what is specially suited to the recording density of a blue laser serving as a light source may be "normalized track cross signal >0" and "0.2<normalized track error signal <0.5" from the viewpoint of broadened groove width and narrowed tracks.

FIG. 8 is a drawing showing an example of the waveform of a wobble signal. FIG. 8-(a) illustrates a monotone signal without modulation. FIG. 8-(b) illustrates a wobble waveform into which FM modulation is introduced. Such modulation is introduced in order to incorporate address information and the like. By the same token, FIG. 8-(c) illustrates PM modulation, FIG. 8-(d) illustrating sawtooth modulation, FIG. 8-(e) illustrating MSK modulation, and FIG. 8-(f) illustrating a wobble waveform into which ON-OFF modulation is introduced. These are not limiting examples, and the characteristics of a wobble signal are typically defined in terms of its amplitude. In many cases, definitions are made based on the track error signal (also referred to as a push-pull signal), rather than directly based on the sum signal. Since the track error signal itself is defined based on the sum signal, however, an error in the sum signal caused by the reflective light from an adjacent layer makes the definitions of the wobble signal also less reliable. Because of this, as in the case of the servo signal, there is a need for the definitions of characteristics that do not sustain an error resulting from the interference with reflective light from other layers. To be specific, it is desirable to have characteristics such as "0.05<normalized wobble signal <0.3".

Figure 9:
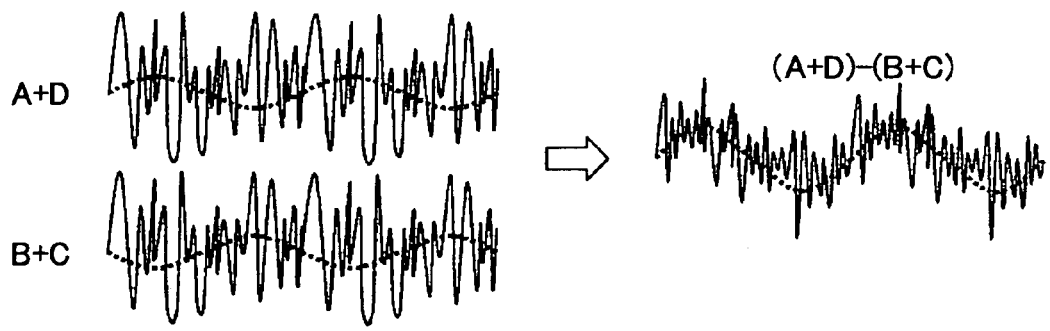
FIG. 9 is a drawing showing an example of the waveform of a wobble signal detected from a prerecorded area.

FIG. 9 is a drawing showing an example of the waveform of a wobble signal detected from a prerecorded area. A+D and B+C are the outputs of the adders provided in the servo-&-wobble detecting circuit 13 shown in the block diagram of FIG. 2, and the wobble signal is represented as (A+D)−(B+C). In the signal for A+D and the signal for B+C, wobble components are buried in the data signal that has a stronger signal magnitude than the wobble signal. When a differential between these two signals is computed, the data signal contained as in-phase components in these two signals are cancelled out, thereby resulting in the wobble signal being detected. Because of the effects of displacement of the optical system, tilting of the medium, shape of the recorded marks, and so on, the magnitude of the data signal contained in the signals for A+D and B+D may become different from each other. In such a case, the data signal cannot be removed completely, and ends up remaining as noise in the wobble signal. In general, wobble quality is defined by the C/N (carrier-to-noise) ratio. In the case of conventional single-layer recording, "wobble C/N value >31 dB" more or less was considered to be appropriate although it varies depending on the wobble frequency. If reflective light from an adjacent prerecorded record layer interferes, the data signal component contained in the reflective light serves as noise against the wobble signal, thereby causing the degradation of quality. The light beam directed to the adjacent record layer is not fully condensed, so that the magnitude of high frequency components such as the data signal is not so strong. Since the wobble signal has extremely small amplitude compared with the data signal, however, the effect of the data signal cannot be disregarded. Accordingly, the definitions of the wobble signal quality are, similarly to the definitions of the amplitude, preferably made under the condition that an adjacent record layer is prerecorded.

If the reproducing of recorded information is performed only when the adjacent record layer is prerecorded, the circuit characteristics may be designed according to such definitions. If possible, however, it is desirable that reproducing can be performed even when the adjacent record layer is unrecorded. In consideration of this, the amount of reflective interfering light may be measured in a case where the adjacent record layer is unrecorded and also in a case where the adjacent record layer is prerecorded, and the difference may be corrected in response to the record status of the adjacent record layer. Further, the characteristics of the various signals may be defined under the condition that the first layer (record layer B) is unrecorded, and may thus be provided separately from the characteristics of the various signals with respect to the second layer (record layer A) that are defined under the condition that the first layer (record layer B) is prerecorded.

Figure 10:
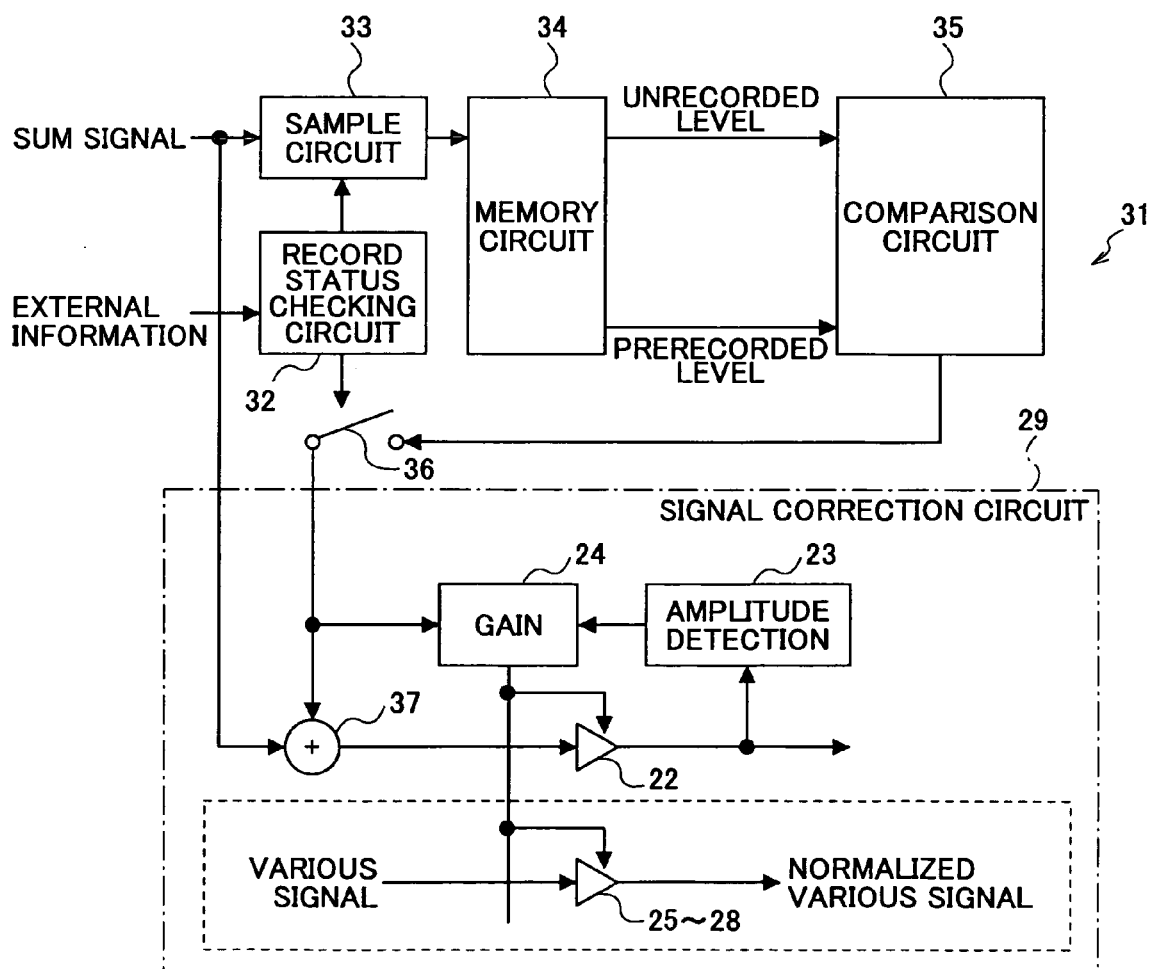
FIG. 10 is a block diagram showing an example of a signal detecting circuit.
Figure 11:
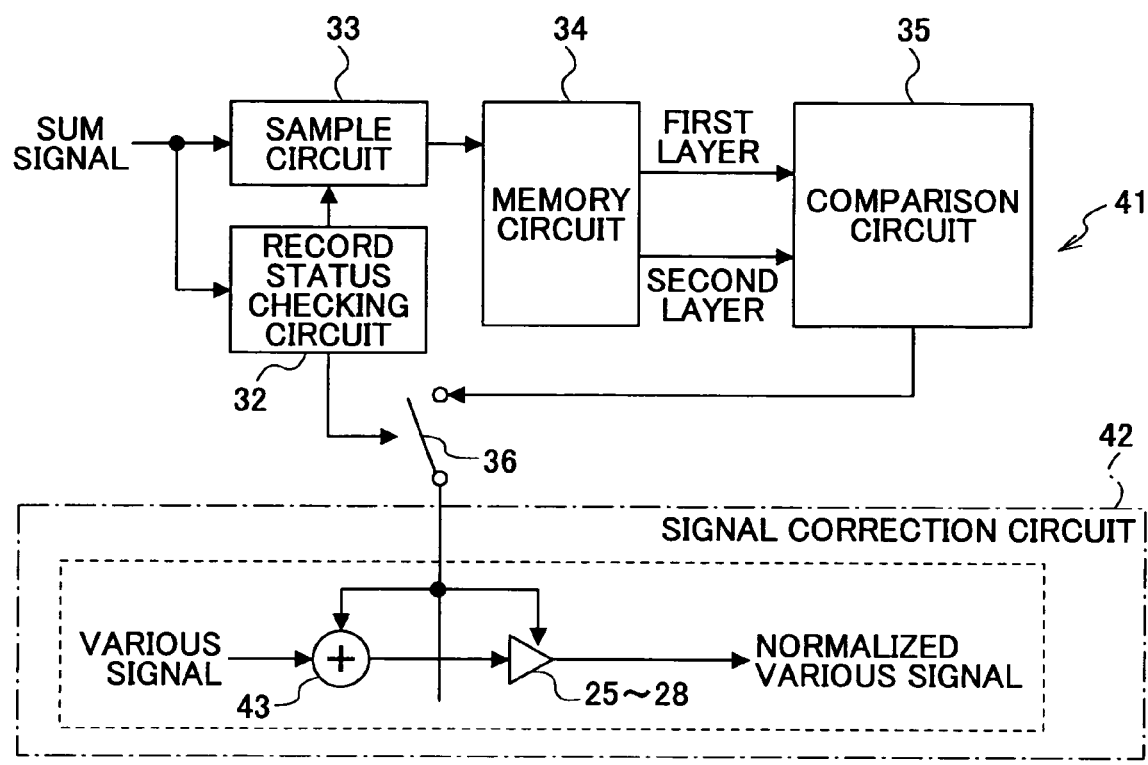
FIG. 11 is a block diagram showing another example of a signal detecting circuit.

FIG. 10 and FIG. 11 illustrate the circuit configuration of signal detecting circuits 31 and 41 for detecting various signals correctly by acquiring and correcting the level of interference of reflective light from other layers. FIG. 10 is a drawing showing an example of a signal detecting circuit that includes an AGC circuit. FIG. 11 is a drawing showing an example of a signal detecting circuit having an AGC circuit that is simplified compared with that of FIG. 10. In these figures, a portion indicated by dotted lines for use for the various signals may be replicated such that each has the same configuration, and these replicas may be coupled in the same manner as shown in FIG. 2 in correspondence to the various signals (focus error signal, track cross signal, and so on). Since these are the same circuits, they are omitted for the explanation purpose.

A record status checking circuit 32 determines whether a record layer adjacent to the record layer being accessed is an unrecorded area or prerecorded area. This can be estimated by reproducing the media management area in advance and comparing the obtained external information with the current access location. An outcome detected by use of another means may alternatively be used as the external information. While the record status checking circuit 32 checks the record status of the adjacent record layer, a sample circuit 33 holds the signal level of the reflection (which may be a maximum amplitude or an average) with respect to the sum signal under the two conditions, i.e., under the condition that the adjacent record layer is unrecorded and under the condition that the adjacent record layer is prerecorded. The resulting levels are stored in a memory circuit 34. In so doing, the record layer being accessed should be placed in the same condition that is either an unrecorded condition or a prerecorded condition under the two conditions. The memory circuit 34 supplies to a comparison circuit 35 the level of the sum signal obtained in the case of the adjacent record layer being unrecorded and the level of the sum signal obtained in the case of the adjacent record layer being prerecorded. The comparison circuit 35 computes a difference between the two sum signal levels. A switching circuit (selection means) 36 is turned on or off in response to the output of the record status checking circuit 32, thereby controlling whether to use the output signal of the comparison circuit 35 as a control line for a signal correction circuit (AGC circuit) 29 via an adder 37.

As a specific example, when the adjacent record layer is unrecorded, the interference of reflective light is strong, so that the control line is turned on so as to use the control line for the signal correction circuit 29, whereas when the adjacent record layer is prerecorded, the control line is turned off for nonuse. The signal correction circuit 29 (chain lines) in FIG. 10 has a similar circuit structure as the AGC circuit shown in FIG. 6 that performs normalization by use of the sum signal. Control is performed such that the voltage of the sum signal is set to a target level. The output of the comparison circuit 35 is then added to (or subtracted from) the resulting sum signal by the adder 37. This cancels an offset of the sum signal level that is caused by the interference with the adjacent record layer. Alternatively, a gain can be used in place of the offset to achieve a similar operation. Namely, the target voltage of the gain circuit 24 may be changed according to the output of the comparison circuit 35, thereby achieving the target voltage that cancels out the offset of the sum signal. In the same manner as in the description of FIG. 6, the amplifiers 25 through 28 may be provided to set the amplification factors of the various signals equal to the amplification factor of the sum signal. In such a case, the sum signal is used for normalization.

The same applies in the case of the signal detecting circuit 41 shown in FIG. 11. In FIG. 11, however, a signal correction circuit 42 does not use the AGC that performs normalization based on the sum signal, but corrects the offset or gain of the various signals independently. In the same manner as in the previous description, the output of the comparison circuit 35 is turned on or off via the switching means 36 under the control of the record status checking circuit 32. The output of the comparison circuit 35 is used to correct the offset or gain of the various signals directly via an adder 43.

Figure 12:
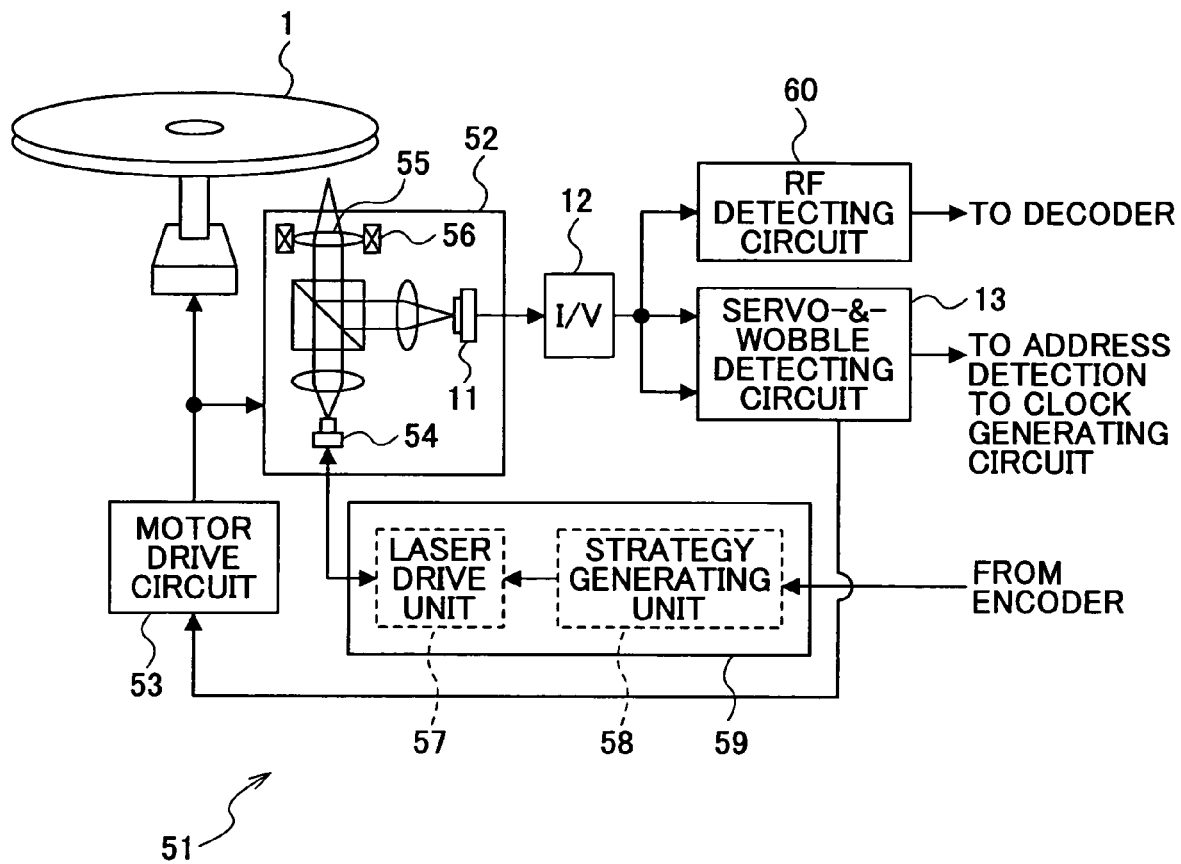
FIG. 12 is a block diagram showing an example of the configuration of an optical disk apparatus.

FIG. 12 is a drawing showing an example of the configuration of an optical disk apparatus (optical information recording/reproducing apparatus) 51. The optical disk apparatus 51 includes a pickup 52 having an optical system mounted thereon, a motor drive circuit 53 for shifting the pickup 52 and rotating the optical information record medium 1, and various electrical circuits.

The pickup 52 includes a semiconductor laser 54 serving as a source of the light beam, optical components for guiding the optical bean to each element, an objective lens 55 for condensing the light beam as a spot on the medium 1, an actuator 56 for controlling the position of the lens so as to make the spot follow a desired point, and the photo detector (PD) 11 for receiving the light reflected from the medium 1.

The electrical circuits include a laser drive circuit 59, which includes a laser drive unit 57 for determining an electric current that drives the semiconductor laser 54 for light emission and a strategy generating unit 58 for determining the waveform of recording and reproducing light emission. The current-versus-light-output characteristics of the semiconductor laser 54 vary significantly in response to temperature. In the laser drive unit 57, thus, an output control mechanism is generally provided to detect the intensity of the light output and to stabilize the output. For the detection of the light intensity, a photo detector incorporated in the semiconductor laser 54 may be used, or a dedicated optical system (not shown) may be provided. User data supplied from an exterior as record data is converted into record information by an encoder under the control of a CPU or the like, and is then transferred from the encoder to the laser drive circuit 59 for recording on the medium 1.

The photo detector 11, which is another circuit, receives a reflection signal from the medium 1, and the reflection signal is converted from current to voltage by the I/V circuit 12 for transfer to a RF detecting circuit 60 and the servo-&-wobble detecting circuit 13. The I/V circuit 12 serves as a first-stage circuit, and may have the conversion efficiency (gain) thereof set separately as appropriate for each of the reproducing operation and the recording operation. The RF detecting circuit 60 extracts information components recorded on the medium 1, and transfers the extracted information components to a decoder. The decoder then converts the transferred information components into user data.

In the servo system of the servo-&-wobble detecting circuit 13 that includes the signal detecting circuit 31 or 41 or the like as described above, information about the position of the spot is extracted, and an instruction is given to the motor drive circuit 53 such as to make the spot follow a desired point, thereby driving the pickup 52 and the actuator 56. Shifting of the focus between the layers is also performed by the movement of the actuator 56. In the wobble system, based on a push-pull signal which is a difference between the outputs of the two-fold-division photo detector 11 divided by a segmenting line extending in the tangential direction of the track on the medium 1, the wobble signal components engraved along the track 4 are extracted for transfer to an address detecting circuit, a clock generating circuit, and/or the like, for example. The wobble signal components are then used for the management of absolute position on the medium 1, medium rotation control, and clock generation synchronized with the medium rotation.

Further, the present invention is not limited to these embodiments, but various variations and modifications may be made without departing from the scope of the present invention.

What is claimed is:

1. An optical information record medium comprising a plurality of record layers including a first record layer and a second record layer that are recordable, wherein a signal characteristic of a normalized track error signal received from the first record layer satisfies a condition defined as: 0.22< normalized track error signal <0.8 when an area of the second record layer adjacent to the first record layer on an incident side thereof along an optical axis of a light beam shone on the first record layer is a prerecorded area.

2. The optical information record medium as claimed in claim 1, wherein the signal characteristic of the normalized track error signal satisfies a condition defined as: 0.2< normalized track error signal <0.5 when a blue light laser is used as a light source.

3. A method of defining medium characteristics with respect to an optical information record medium having a plurality of record layers including a first record layer and a second record layer that are recordable for an optical information reproducing apparatus including a light source for emitting a light beam, a photo detector for detecting the light beam reflected by the record medium, and a signal detecting circuit for detecting a signal output from the photo detector, said method comprising defining a signal characteristic of a track error signal received from the first record layer in response to a record condition of an area of the second record layer adjacent to the first record layer on an incident side thereof along an optical axis of a light beam shone on the first record layer, wherein the track error signal is defined as a signal waveform having zero-cross points at a center of a groove, and the track error signal as normalized satisfies a condition defined as: 0.22< normalized track error signal <0.8 when the area of the second record layer is a prerecorded area.

4. The method of defining medium characteristics as claimed in claim 3, wherein the signal characteristic of the normalized track error signal satisfies a condition defined as: 0.2< normalized track error signal <0.5 when a blue light laser is used as a light source.

5. An optical information recording/reproducing apparatus for recording or reproducing information with respect to the optical information record medium as claimed in claim 1, comprising:
   a rotation mechanism to drive and rotate the optical information record medium; and
   a pickup having a light source and an objective lens to shine a light beam on the optical information record medium and to receive light reflected from the optical information record medium.

6. A method of examining medium characteristics with respect to an optical information record medium having a plurality of record layers including a first record layer and a second record layer that are recordable for an optical information reproducing apparatus including a light source for emitting a light beam, a photo detector for detecting the light beam reflected by the record medium, and a signal detecting circuit for detecting a signal output from the photo detector, said method comprising detecting a signal characteristic of a track error signal received from the first record layer in response to a record condition of an area of the second record layer adjacent to the first record layer on an incident side thereof along an optical axis of a light beam shone on the first record layer, wherein the track error signal is detected as a signal waveform having zero-cross points at a center of a groove, and the track error signal as normalized satisfies a condition defined as: 0.22< normalized track error signal <0.8 when the area of the second record layer is a prerecorded area.

7. The method of examining medium characteristics as claimed in claim 6, wherein the signal characteristic of the normalized track error signal satisfies a condition defined as: 0.2< normalized track error signal <0.5 when a blue light laser is used as a light source.

* * * * *